US008270549B2

(12) United States Patent
Luo et al.

(10) Patent No.: US 8,270,549 B2
(45) Date of Patent: Sep. 18, 2012

(54) METHOD AND SYSTEM FOR IMPLEMENTING A MULTIPLE-INPUT MULTIPLE-OUTPUT (MIMO) DECODER SCHEME

(75) Inventors: Ping Luo, Alberta (CA); Changqin Huo, Alberta (CA)

(73) Assignee: Fujitsu Semiconductor Limited, Kanagawa (JP)

( * ) Notice: Subject to any disclaimer, the term of this patent is extended or adjusted under 35 U.S.C. 154(b) by 487 days.

(21) Appl. No.: 12/510,653

(22) Filed: Jul. 28, 2009

(65) Prior Publication Data

US 2010/0027721 A1 Feb. 4, 2010

Related U.S. Application Data

(60) Provisional application No. 61/085,287, filed on Jul. 31, 2008.

(51) Int. Cl.
*H04B 7/10* (2006.01)
(52) U.S. Cl. ........................................ 375/347
(58) Field of Classification Search .................. 375/260, 375/267, 341, 347
See application file for complete search history.

(56) References Cited

U.S. PATENT DOCUMENTS

| 2004/0038653 A1* | 2/2004 | Claussen et al. ............... 455/130 |
| 2004/0066866 A1* | 4/2004 | Tong et al. ..................... 375/347 |
| 2009/0074096 A1* | 3/2009 | Hansen et al. ................. 375/260 |

OTHER PUBLICATIONS

Draft Standard for Local and Metropolitan Area Networks, Part 16: Air Interface for Fixed Broadband Wireless Access Systems, IEEE Std. 802.16™-2004 (Revision of IEEE Std. 802.16-2001, Oct. 1, 2004 (857 pages).
Draft Standard for Local and Metropolitan Area Networks, Part 16: Air Interface for Broadband Wireless Access Systems, P802.16Rev2/DT Oct. 2008, © 2008 IEEE (2080 pages).
Draft Standard for Local and Metropolitan Area Networks, Part 16: Air Interface for Fixed Broadband Wireless Access Systems, IEEE Std. 802.16™-2004 (Revision of IEEE Std. 802.16-2001 (857 pages), Jun. 2004.
CEWIT—Center for Excellence in Wireless and Information Technology, Introduction to Wireless MIMO—Theory and Applications, IEEE LI, Nov. 15, 2006 (63 pages).

* cited by examiner

*Primary Examiner* — Leon-Viet Nguyen
(74) *Attorney, Agent, or Firm* — Baker Botts L.L.P.

(57) ABSTRACT

The teachings of the present disclosure relate to a method for receiving "N" data streams (wherein "N" is a number greater than one) from "N" endpoints. Each of the data streams are received from a different respective endpoint. The method also includes decoding the "N" data streams by generating a decoding signal input comprising the "N" data streams and then iteratively repeating the following steps "N"−1 times: determine a most reliable stream; decode the most reliable stream using linear multiple-input and multiple-output (MIMO) decoding; output the decoded most reliable stream; estimate a signal estimate based on the most reliable stream and modulation information associated with the most reliable stream; and generate a residual signal that comprises the remaining data streams less the signal estimate. Upon the residual signal comprising two data streams, the method includes updating the decoding signal input to be the residual signal. Upon the residual signal comprising a single received stream, the method includes decoding the residual signal using a maximum likelihood decoder.

13 Claims, 5 Drawing Sheets

METHOD AND SYSTEM FOR IMPLEMENTING A MULTIPLE-INPUT MULTIPLE-OUTPUT (MIMO) DECODER SCHEME

CROSS-REFERENCE TO RELATED APPLICATION

This application claims the benefit of priority under 35 U.S.C. §119(e) of U.S. Provisional Application Ser. No. 61/085,287 filed Jul. 31, 2008.

TECHNICAL FIELD

The present invention relates generally to wireless networks and more particularly to methods and systems for implementing a multiple-input multiple-output (MIMO) decoder scheme.

BACKGROUND

Multiple-input multiple-output (MIMO) wireless communication techniques have been employed in modern wireless systems to achieve increases in data throughput without corresponding increases in frequency bandwidth or transmittal power. The higher data throughput is achieved by fully exploiting the multiple antennas at the transmitter(s) and the receiver. More specifically, in a MIMO system, N data streams are transmitted in parallel from N antennas at one or several transmitters. At the receiver, these N transmitted data streams will be received with M antennas, where M is less than or equal to N. The received data streams then need to be decoded.

One type of MIMO decoder is the maximum likelihood decoder (MLD). While this type of decoder is relatively accurate, it can be computationally very expensive. Its complexity is extremely high for transmitted signals having high-orders of modulation (e.g. M-Quadrature Amplitude Modulation (QAM) with M being 16, 64, or 256) and/or for large numbers of transmitted data streams. Another type of MIMO decoder is a linear MIMO decoder, such as Minimum Mean Square Error (MMSE) decoder or a Zero-Force (ZF) decoder. These decoders may achieve low decoding complexity at the cost of noticeable degradation in the decoding performance.

SUMMARY

The teachings of the present disclosure relate to a method for receiving "N" data streams (wherein "N" is a number greater than one) from "N" endpoints. Each of the data streams are received from a different respective endpoint. The method also includes decoding the "N" data streams by generating a decoding signal input comprising the "N" data streams and then iteratively repeating the following steps "N"−1 times: determine a most reliable stream; decode the most reliable stream using linear multiple-input and multiple-output (MIMO) decoding; output the decoded most reliable stream; estimate a signal estimate based on the most reliable stream and modulation information associated with the most reliable stream; and generate a residual signal that comprises the remaining data streams less the signal estimate. Upon the residual signal comprising two data streams, the method includes updating the decoding signal input to be the residual signal. Upon the residual signal comprising a single received stream, the method includes decoding the residual signal using a maximum likelihood decoder.

Technical advantages of particular embodiments may include improving the decoding performance used in a MIMO system with only a slight increase in the decoder's complexity. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
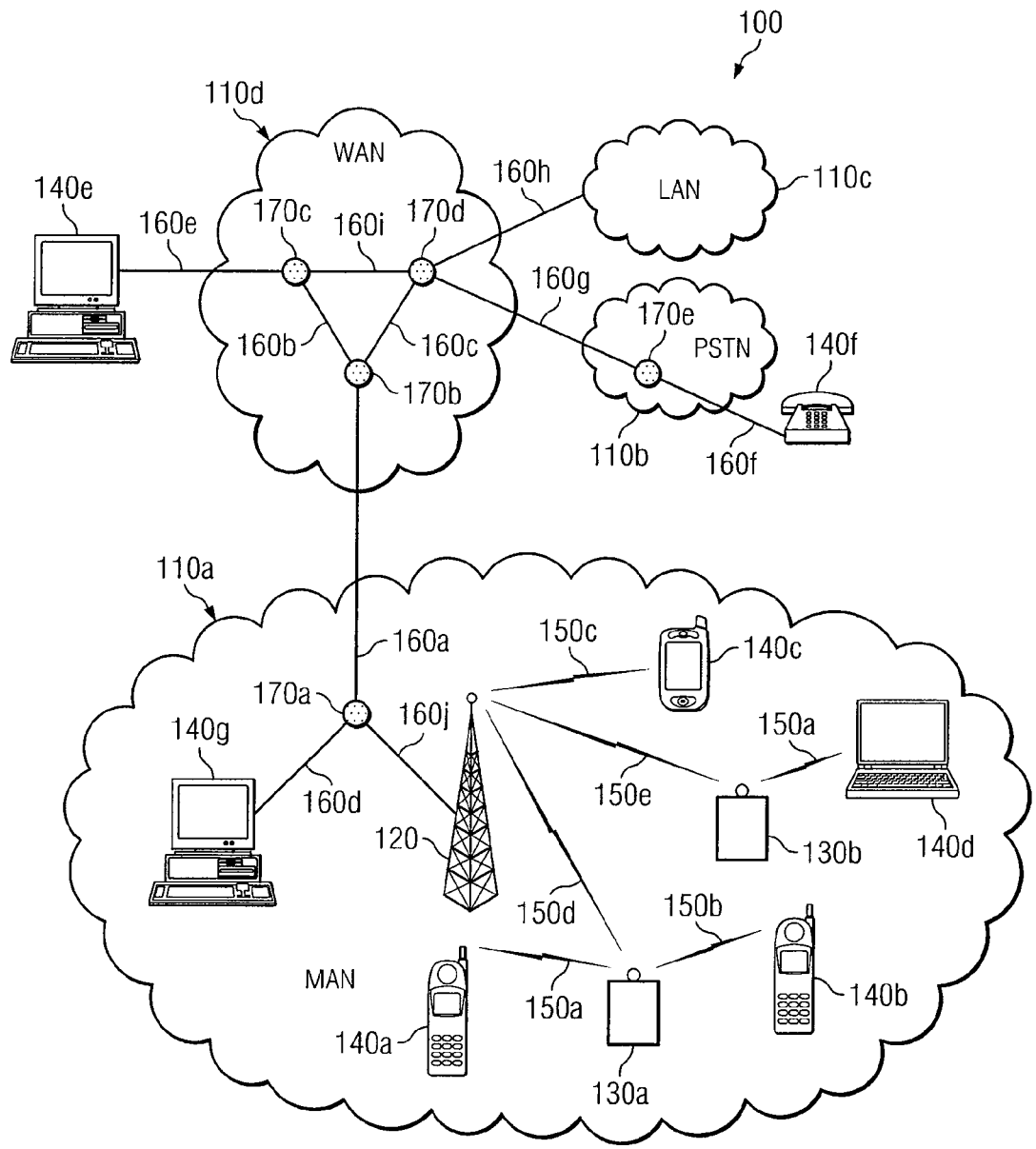
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110 utilizing any of a variety of communication protocols. Network, 110a, which may be a wireless network in which one or more of the components of network 110a, such as base station 120, relay stations 130 and endpoints 140, may comprise multiple-input multiple-output (MIMO) technology. In particular embodiments, those components comprising MIMO technology may use iterative interference cancellation, along with a combination of a maximum likelihood decoder (MLD) and a minimum mean square error (MMSE) decoder, to decode any received data streams. This may allow for the MIMO device to achieve improved decoding performance, as compared to simply using an MMSE decoder, without incurring a large computational cost, as compared to simply using an MLD decoder.

Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality that may be provided by a network. Networks 110 may provide their respective services using any of a variety of protocols for either wired or wireless communication. For example, network 110a may comprise any one of a variety of different wireless technologies such as 3G, 802.16 (popularly known as WiMAX), or any other wireless technology that supports the use of MIMO technology.

Although communication system 100 includes four different types of networks, networks 110a-110d, the term "network" should be interpreted as generally defining any network or combination of networks capable of transmitting analog or digital signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Networks 110 may be connected to each other and with other networks via a plurality of wired links 160, wireless links 150, and nodes 170. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d. For purposes of illustration and simplicity of explanation, network 110a is a MAN that may be implemented, at least in part, via WiMAX, network 110b is a PSTN, network 110c is a LAN, and network 110d is a WAN.

In some embodiments, wireless links 150, of network 110a, may represent wireless links using, for example, WiMAX. A wireless connection, or link, may comprise various wireless resources such as, for example, a combination of a particular center frequency, a particular bandwidth, a particular time slot, and/or a particular subchannel (for example, as described in a downlink or uplink MAP). In addition, external factors, such as distance, interference, and obstructions, may change the characteristics of a signal. For example, wireless link 150a may, over time, change between two or more of Additive Gaussian White Noise (AWGN), Line of Sight (LOS) (Rician), Non-LOS (NLOS) (Rayleigh), fading, multipath fading, or Pedestrian Band 3 km (PB3). The type of channel may impact the modulation and coding scheme (MCS) that is used (e.g., Quadrature Phase-Shift Keying (QPSK), 16-Quadrature Amplitude Modulation (QAM), 64-QAM, etc.).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. This may allow network 110b, a PSTN network, to be able to transmit and receive communications from other non-PSTN networks, such as network 110d, an IP network. As a gateway, node 170e may work to translate communications between the various protocols used by different networks.

Endpoints 140 may provide data or network services to a user through any combination of hardware, software embedded in a computer readable medium, and/or encoded logic incorporated in hardware or otherwise stored (e.g., firmware). For example, endpoints 140a-140g may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals.

Within wireless network 110a, each of endpoints 140a-140d are connected to one of base station 120 or relay station 130. For simplicity, the component to which an endpoint is connected may generally be referred to as an access station. For example, the access station for endpoint 140a is relay station 130a.

Although FIG. 1 illustrates a particular number and configuration of endpoints, connections, links, and nodes, communication system 100 contemplates any number or arrangement of such components for communicating data. For example, communication system 100 may contain fewer or more networks 110. Furthermore, the interconnections between networks 110 may vary from those depicted in FIG. 1. In addition, elements of communication system 100 may include components centrally located (local) with respect to one another or distributed throughout communication system 100.

Figure 2:
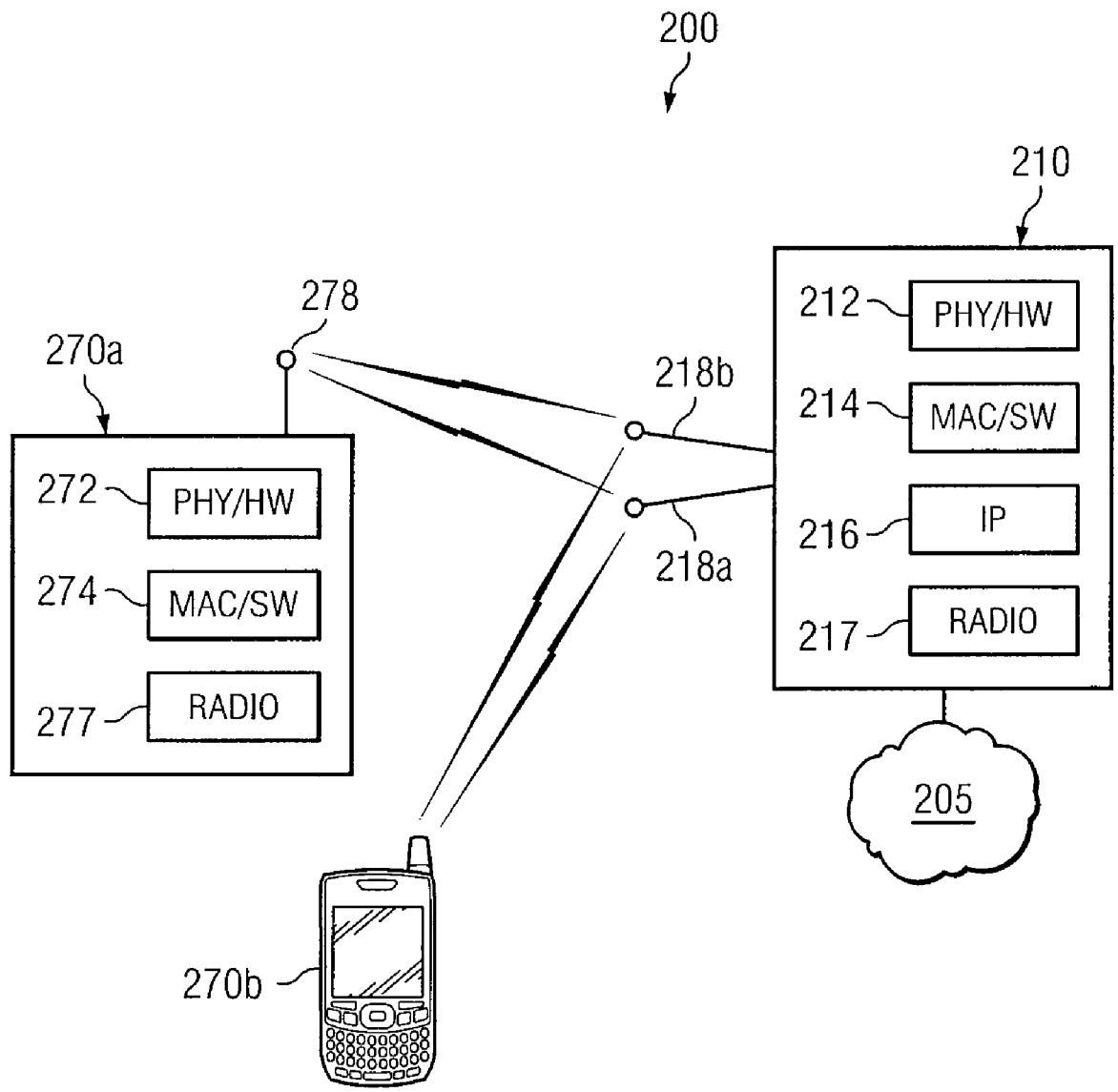
FIG. 2 illustrates a wireless network comprising a more detailed view of an endpoint and a base station, in accordance with a particular embodiment.

FIG. 2 illustrates a wireless network comprising a more detailed view of an endpoint, and a base station, in accordance with a particular embodiment. More specifically, the depicted embodiment is a simplified scenario comprising network 205, base station 210, and endpoints 270. In different embodiments network 200 may comprise any number of wired or wireless networks, base station, endpoints, relay stations, and/or any other components that may facilitate or participate in the communication of data and/or signals whether via wired or wireless connections.

Base station 210 comprises physical layer (PHY)/hardware (HW) block 212, media access control layer (MAC)/software (SW) block 214, communication interface 216, radio 217 and antennas 218. Similarly, endpoints 270 comprise PHY/HW block 272, memory 274, radio 277, and antenna 278 (for convenience only the components of endpoint 270a are depicted). These components may work together in order to provide wireless networking functionality, such as providing endpoints with wireless MIMO connections in a wireless network (e.g., a WiMAX wireless network).

Network 205 may comprise one or more interconnected networks operated by one or more different operators. Though network 205 is depicted as a single network, it may comprise any number of the networks described above with respect to FIG. 1. For example, network 205b may comprise the Internet, a LAN, WAN, MAN, PSTN or some combination of the above.

PHY/HW blocks 212 and 272 may include any hardware needed for the operation of base station 210 and endpoint 270, respectively. For example, PHY/HW blocks 212 and 272 may each comprise one or more processors. Each processor may be a microprocessor, controller, application specific integrated circuit (ASIC), field programmable gate array (FPGA), or any other suitable computing device, resource, or combination of hardware, stored software and/or encoded logic operable to provide, either alone or in conjunction with other components, (e.g., memory) wireless networking functionality. Such functionality may include providing various wireless features discussed herein. For example, one or more of the processors within PHY/HW block 212 may be able to decode a plurality of wireless signals detected by antennas 218.

As another example, PHY/HW blocks 212 and 272 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by base station 210 and endpoint 270, respectively. This may include software embedded in a computer readable medium, and/or encoded logic incorporated in hardware or otherwise stored (e.g., firmware). For example, the memory modules may store information regarding one or more previous calculations used in decoding a plurality of signals received by the base station in a MIMO scheme.

MAC/SW blocks 214 and 274 may include any software, logic, or other information needed for the operation of base station 210 and endpoint 270, respectively. In particular embodiments, the software, logic or other information may be stored within the memory modules of PHY/HW blocks 212 and 272, respectively. For example, MAC/SW blocks 214 and 274 may comprise, stored within the respective memory modules, logic that when executed by a processor within the respective PHY/HW block is operable to implement its respective portion of a MIMO wireless network.

Radios 217 and 277 may be coupled to or a part of antennas 218 and 278, respectively. Radios 217 and 277 may receive digital data that is to be sent out to other base stations, relay stations and/or endpoints via a wireless connection. Radios 217 and 277 may convert the digital data into a radio signal having the appropriate center frequency and bandwidth parameters. These parameters may be predetermined, for example, by a combination of PHY/HW block 212 and MAC/SW block 214 of base station 210. The radio signal may then be transmitted via antennas 218 and 278 to the appropriate recipient. Similarly, radios 217 and 277 may work in reverse by converting radio signals received via antennas 218 and 278, respectively, into digital data to be processed by PHY/HW blocks 212, 252, or 272 and/or MAC/SW blocks 214, 254, or 274 as appropriate.

Antennas 218 and 278 may be any type of antenna capable of transmitting and receiving data and/or signals wirelessly. In some embodiments, antennas 218 and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, and radio 277 and antenna 278 may each form a wireless interface.

Communication interface 216 may be used for the wired communication of signaling and/or data between base station 210 and network 205. For example, communication interface 216 may perform any formatting or translating that may be needed to allow base station 210 to send and receive data from network 205 over a wired connection. While not depicted, endpoints 270 may also include wired interfaces.

Endpoints 270 may be any type of endpoints able to wirelessly send and receive data and/or signals to and from base station 210. Some possible types of endpoints 270 may include desktop computers, PDAs, cell phones, smart phones, laptops, and/or VoIP phones.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Some embodiments may include additional features.

Figure 3A:
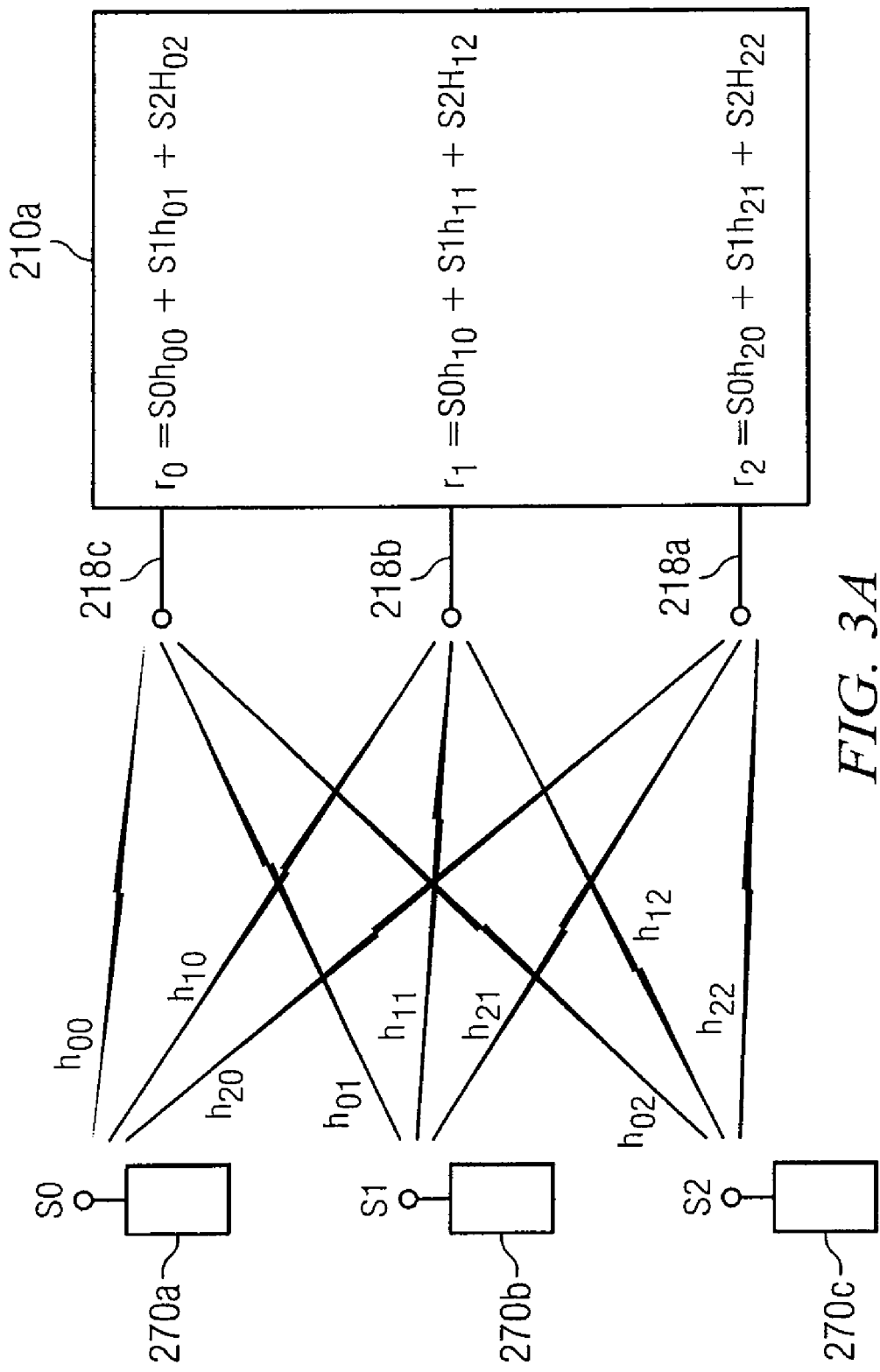
FIG. 3A depicts a 3×3 MIMO system and the mathematical representation of certain signals used in FIG. 3B, in accordance with particular embodiments.
Figure 3B:
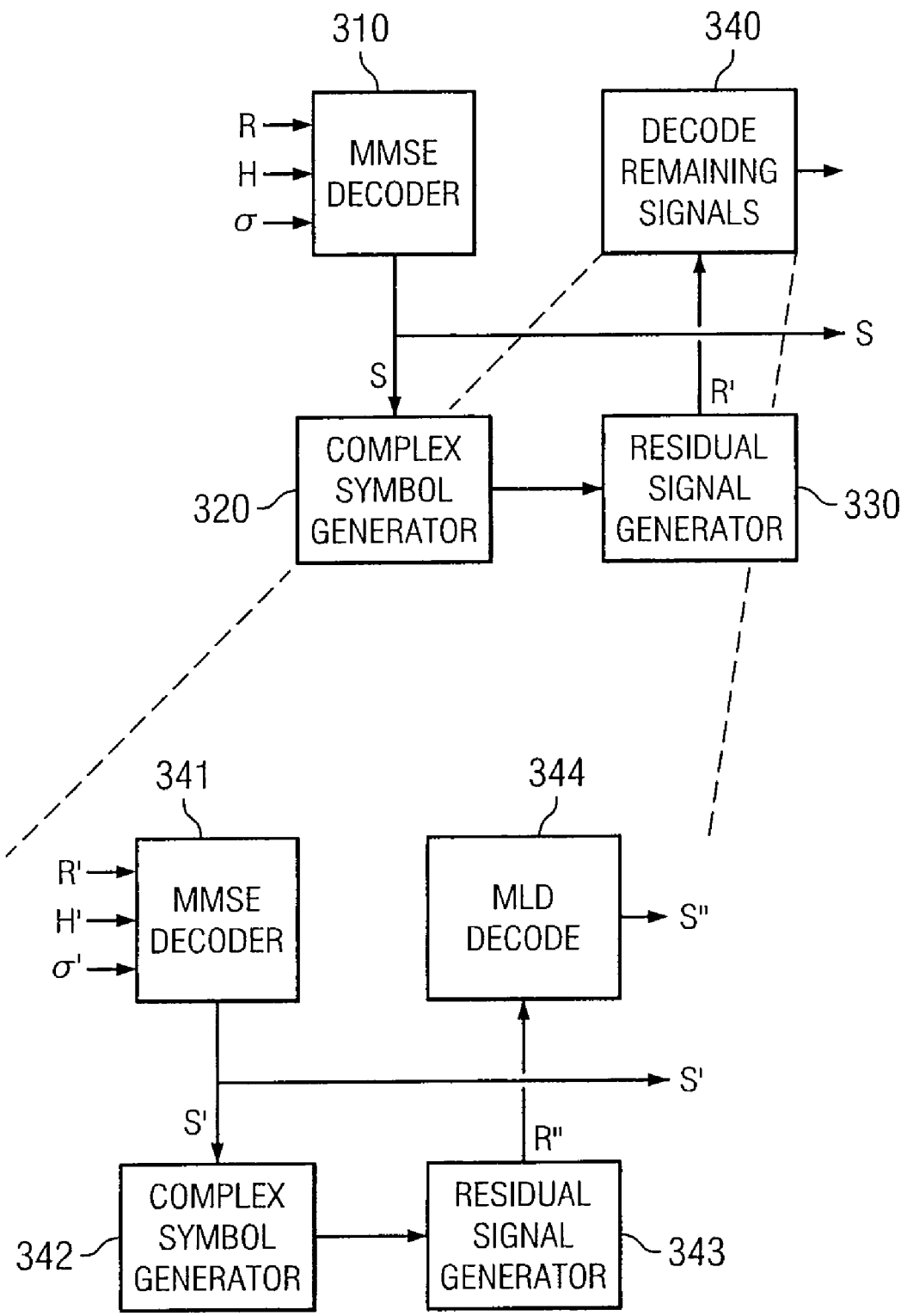
FIG. 3B depicts a block diagram of a MIMO decoder for a 2×2 MIMO system, in accordance with particular embodiments.

FIG. 3A depicts a 3×3 MIMO system and the mathematical representation of certain signals used in FIG. 3B, in accordance with particular embodiments. Depicted in FIG. 3A is base station 210a which may comprise similar components to those of base station 210 depicted in FIG. 2 with the exception that base station 210a comprises an additional antenna 218c. It may be assumed that base station 210a has established wireless connections with endpoints 270. As depicted, all three endpoints 270 are transmitting their own respective data stream S0, S1, and S2. Each of the three antennas 218 may independently receive a signal from each of the three endpoints 270. Furthermore, differences between antennas 218 (e.g., location, alignment, etc.) may result in channel information h associated with each data stream differing for each antenna 218. In other words, each data stream (e.g., data stream S0) transmitted by endpoints 270 may be received as three separate instances by the three separate antennas 218, each having different channel information.

The data streams received by each antenna 218 may comprise different noise and/or modulation characteristics. Accordingly, the data information r detected by each antenna may be different. For each antenna 218, the respective data information r may be a sum of all the data streams and their associated channel information that are received by the respective antenna. The signals received at antennas 218 may collectively be referred to as the input data information R. R is a vector containing the signals r from each of the three antennas.

FIG. 3B depicts a block diagram of a MIMO decoder for a 3×3 MIMO system, in accordance with particular embodiments. In the 3×3 system of FIG. 3 it may be assumed that there are three endpoints and that the base station comprises three separate antennas. Each of the three endpoints may simultaneously (or nearly simultaneously) transmit their own respective data stream. For purposes of explanation, it may also be assumed that the various blocks of FIG. 3B are being implemented via, for example, the components of base station 210 depicted in FIG. 2.

The blocks depicted in FIG. 3B iteratively decode an input signal from endpoints 270 to generate an output signal for subsequent processing by base station 210a. The received data streams may be decoded in stages where one stream is decoded during each stage. Thus, the number stages may be based on the number of received data streams. In particular embodiments, blocks 310-340 may be used for the initial stages while blocks 341-344 may be used for the final two stages.

For example, to decode seven streams, the first five stages would include blocks 310-340, and the last two stages would include blocks 341-344. More specifically, seven streams would initially be received by block 310. In the first stage, block 310 decodes the most reliable of the seven streams, blocks 320-330 remove the decoded stream and any interference associated therewith, and then block 340 decodes the remaining streams. In this instance, with six streams remaining, the second stage would include the six remaining streams being sent to block 310 which would decode the most reliable of the six remaining streams, blocks 320-330 remove the decoded stream and its interference, and block 340 would decode the remaining five streams. This would repeat until there are only two streams remaining for block 340 to decode. At this point block 341 decodes the most reliable of the two streams, blocks 342-343 remove the decoded stream and its interference, and then block 344 decodes the final remaining stream. In some instances, the data streams that need to be decoded may be referred to as a decoding signal input.

This iterative decoder scheme may improve the decoding performance, when compared with traditional linear decoders while also reducing implementation complexity when compared with traditional MIMO decoders such as MLD decoders. In the depicted 3×3 system, there are three transmitted data streams, S0, S1, and S2, that need to be decoded. Two of the three data streams may be decoded using a linear MIMO decoding method while the final data stream may be decoded using maximum likelihood estimation.

Block 310 is a Minimum Mean Square Error (MMSE) decoder. Other embodiments may use different decoders which provide relatively quick and computationally inexpensive decoding, such as linear decoders (e.g., Zero-Force decoders). Block 310 receives as its input the data information R, the channel information H and the noise/modulation information σ. In embodiments in which there are more than three received data streams, the input to block 310 during subsequent iterations would comprise the residual signals R', H' and σ' discussed below. R, H and σ may be based on how the data streams S0, S1, and S2, transmitted by each of the three endpoints 270a, 270b, and 270c, are received. The data information R may be represented as a vector comprising the input from the three different antennas:

$$R = \begin{bmatrix} r_0 \\ r_1 \\ r_2 \end{bmatrix},$$

and the channel information H may be represented as a matrix that contains the channel information h associated with each data stream (S0, S1, and S2) from each endpoint (270a, 270b, and 270c) as detected by each antenna (218a, 218b, and 218c):

$$H = \begin{bmatrix} h_{a0}, h_{a1}, h_{a2} \\ h_{b0}, h_{b1}, h_{b2} \\ h_{c0}, h_{c1}, h_{c2} \end{bmatrix}$$

(e.g. $h_{c1}$ may be the channel information detected by antenna 218c and associated with data stream S1). Based on this information, the processor of PHY/HW block 212 (FIG. 2) may select the most reliable signal to be decoded for output. To avoid confusion, the decoded data streams outputted by blocks 310, 341, and 344 will be referred to as S, S' and S" as opposed to S0, S1, and S2 used to refer to the data streams transmitted by endpoints 270. In particular embodiments, the output data stream S of block 310 may be selected based on a determination of either the average decoding reliability or the instant decoding reliability. For example, PHY/HW block 212 (FIG. 2) may determine that the most reliable data stream is the one that is received with the highest power or the highest MCS level.

In addition to being the decoded output stream associated with a particular endpoint, data stream S is also an input into block 320. Block 320 is a complex symbol generator. At block 320, the processor of PHY/HW block 212 (FIG. 2) also uses the detected modulation scheme associated with data stream S to generate the closest point in the respective constellation to data stream S, as is well known in the art. For example, if the data stream received from a particular endpoint comprises 16-QAM modulation, then block 320 would output an estimated data stream based on the closest point, from among the 16 available points in a 16-QAM constellation, to which data stream S was closest. This estimated data stream is then provided to block 330.

Block 330 is a residual signal generator. The residual signal R' generated by block 330 is used for subsequent stages of decoding. Residual signal R' is generated by removing the estimated data stream generated at block 320 and its associated noise from each of the base station's three antennas 218 from the data information R. For example, if data stream S is associated with endpoint 270b and thus transmitted data stream S1, then $$R' = R - \begin{bmatrix} h_{a1} \\ h_{b1} \\ h_{c1} \end{bmatrix} S_{1(estimate)}.$$

This may account for any impact decoded data stream S may have had on the remaining data streams. The functions described above with respect to blocks 320 and 330 effectively provide interference canceling. In other words, removing data stream S and its associated noise from data information R may, in essence, remove from the remaining data streams the interference caused by data stream S.

Block 340 is for decoding the residual signal. Depending on the embodiment and the number of completed iterations, block 340 may comprise an MLD decoder, another set of blocks similar to blocks 310, 320, 330, and 340, or a set of blocks similar to blocks 341-344. For example, if there were only two data streams to decode then block 340 may comprise an MLD decoder. More specifically, the first data stream would be decoded by a linear decoder at block 310 and the second data stream would be decoded by an MLD decoder at block 340.

In the depicted embodiment, block 340 comprises blocks 341-344. Blocks 341-343 may be similar to blocks 310, 320 and 330, respectively. Block 341 uses a linear decoder to output decoded data stream S'. Decoded data stream S' may be used by the processor of PHY/HW block 212 (FIG. 2) to generate an estimated data stream that is used by the processor to generate residual signal R" at block 343. Residual signal R" may then be decoded (as described below) and data stream S" is output at block 344.

Block 344 is an MLD decoder. Other embodiments may use different decoders which provide relatively accurate but computationally expensive decoding. Block 344 uses the data information, the channel information, and the noise/modulation information that is remaining from the original R, H, and σ information used by block 310 after removing data streams S and S'.

Because each of the first iterations selects the most reliable data stream for output, the final remaining data stream decoded by block 344 is necessarily the least reliable. Thus, the most accurate decoder is only used with the least reliable signals(s). This increases the overall accuracy of the decoding (compared to using only block 310) without having to perform a large amount of computationally complex decoding (as compared to using only block 344).

Once the data streams have been decoded, base station 210a may then perform any desired processing and/or manipulation of the received information.

Figure 4:
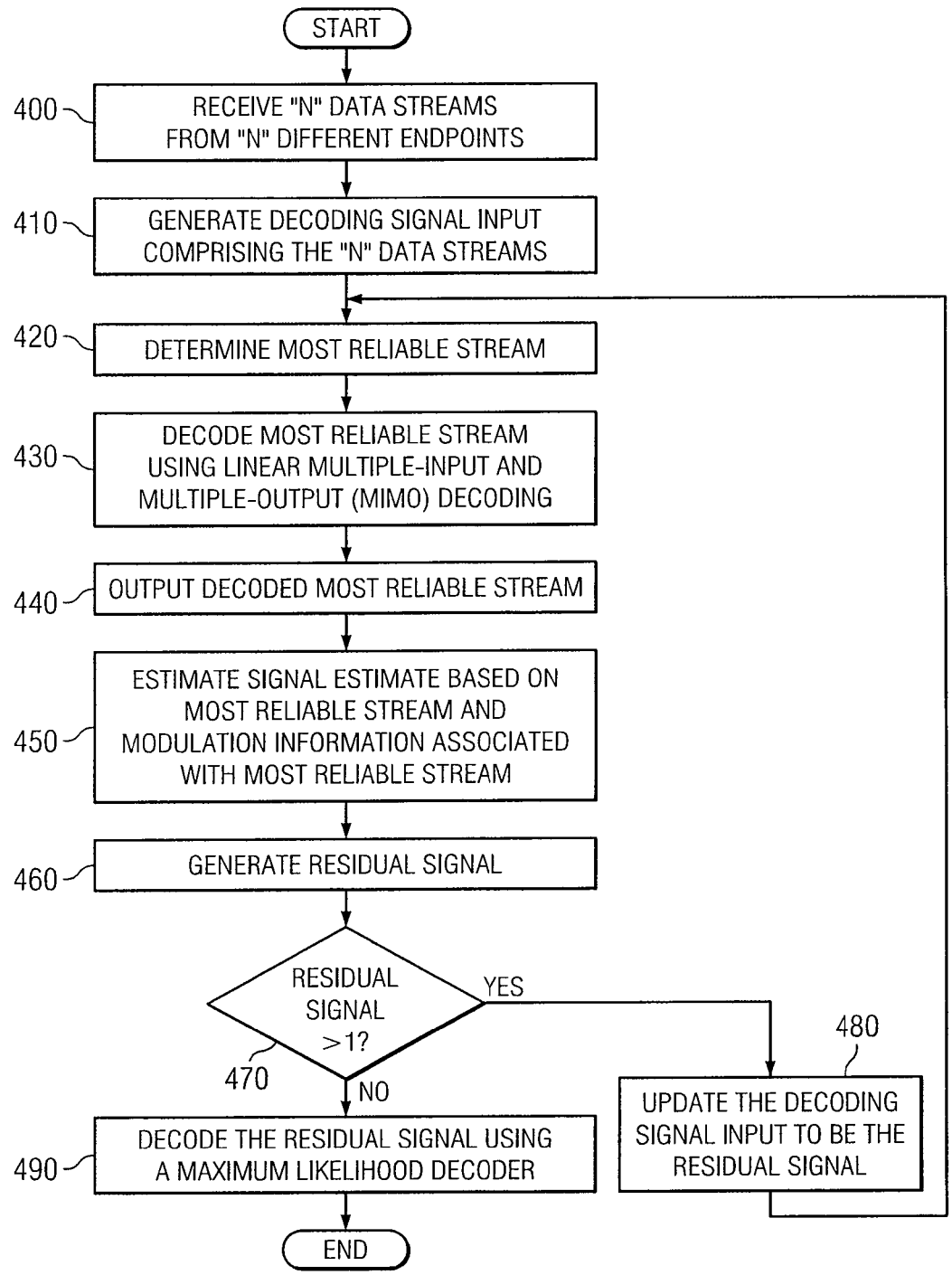
FIG. 4 illustrates a method for implementing a MIMO decoder scheme, in accordance with a particular embodiment.

FIG. 4 illustrates a method for implementing a MIMO decoder scheme, in accordance with a particular embodiment. The method begins at step 400 where "N" ("N" is greater than one) data streams from "N" endpoints are received at a base station. Each of the "N" data streams may be received from a different respective endpoint at one or more of a plurality of antennas. The "N" data streams may each have their own respective channel information which may vary at each of the plurality of antennas (see, for example, FIG. 3A). The "N" data streams are then decoded by the base station in steps 410-490.

At step 410 a decoding signal input is generated which initially comprises the "N" data streams. The decoding signal input may be updated based on a residual signal (step 460) that is generated after a data stream from the decoding signal input has been decoded.

At step 420 the most reliable stream is determined. The reliability of the streams may be determined using any of a variety of techniques, such as the power or MCS levels of the streams. Then, at step 430 the most reliable stream is decoded using linear multiple-input and multiple-output (MIMO) decoding. Some embodiments may use a different type of computationally inexpensive decoding.

At step 440 the decoded most reliable stream is outputted for use by the base station. The decoded most reliable stream is also used at step 450. More particularly, at step 450 a signal estimate is estimated based on the most reliable stream outputted at step 440 and modulation information associated with the most reliable stream. The modulation information may be At step 460 a residual signal is generated that comprises the remaining data streams less the signal estimate. This may remove the interference caused by the decoded most reliable stream on the remaining streams.

If, at step 470, the number of data streams of the residual signal is found to be greater than one, then at step 480 the decoding signal is updated to be the residual signal and the method returns to step 420 to decode remaining data streams. Thus, steps 420-480 repeat until there is only one data stream to be decoded. If, at step 470, the number of data streams of the residual signal is one, then at step 490 the one remaining data stream is decoded using a maximum likelihood decoder. Some embodiments may use a different type of relatively accurate decoding.

Some of the steps illustrated in FIG. 4 may be combined, modified or deleted where appropriate, and additional steps may also be added to the flowchart. For example, in some embodiments, more than one data stream may be decoded using the maximum likelihood decoder. Additionally, steps may be performed in any suitable order without departing from the scope of particular embodiments.

Although particular embodiments have been described in detail, it should be understood that various other changes, substitutions, combinations and alterations may be made hereto without departing from the spirit and scope of the disclosure. For example, although an embodiment has been described with reference to a number of elements included within communication system 100 such as endpoints and base stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:

1. A method comprising:
receiving "N" data streams from "N" endpoints, each data stream received from a different respective endpoint, wherein "N" is a number greater than one;
decoding the "N" data streams, wherein decoding the "N" data streams comprises:
generating a decoding signal input comprising the "N" data streams;
iteratively repeating the following steps "N"-1 times:
determining a most reliable data stream;
decoding the most reliable data stream using linear multiple-input and multiple-output (MIMO) decoding;
outputting the decoded most reliable data stream;
estimating a data stream estimate based on the most reliable data stream and modulation information associated with the most reliable data stream;
generating a residual signal that comprises the remaining data streams less the data stream estimate; and
upon the residual signal comprising two data streams, updating the decoding signal input to be the residual signal; and
upon the residual signal comprising a single received data stream, decoding the residual signal using a maximum likelihood decoder.

2. A method comprising:
receiving a plurality of data streams from an equal numbered plurality of endpoints;
decoding the plurality of data streams in an equal numbered plurality of stages, wherein at least a first stage uses linear multiple-input and multiple-output (MIMO) decoding and at least a last stage uses maximum likelihood decoding; and
generating a residual signal during each stage of decoding except for a final stage, the residual signal comprising a subset of data streams less than the plurality of data streams, wherein:
for the first stage, generating the residual signal comprises removing the stream decoded during the first stage from the plurality of data streams; and
for each subsequent stage except for the last stage, generating the residual signal comprises removing the stream decoded during the respective stage from the plurality of data streams of a previous residual signal generated during an immediately preceding stage.

3. The method of claim 2, further comprising determining a most reliable stream to be the decoded stream.

4. The method of claim 3, wherein a reliability of a stream is determined using a power level associated with each of the data streams or a modulation and coding scheme value associated with each of the data streams.

5. The method of claim 2, wherein the linear MIMO decoding comprises Minimum Mean Square Error (MMSE) decoding.

6. A system comprising:
an interface configured to receive a plurality of data streams from an equal numbered plurality of endpoints; and
a processor coupled to the interface, the processor configured to decode the plurality of data streams in an equal numbered plurality of stages, wherein at least a first stage uses linear multiple-input and multiple-output (MIMO) decoding and at least a last stage uses maximum likelihood decoding;

the processor further configured to generate a residual signal during each stage of decoding except for a final stage, the residual signal comprising a subset of data streams less than the plurality of data streams, wherein:
  for the first stage, generating the residual signal comprises removing the stream decoded during the first stage from the plurality of data streams; and
  for each subsequent stage except for the last stage, generating the residual signal comprises removing the stream decoded during the respective stage from the plurality of data streams of a previous residual signal generated during an immediately preceding stage.

7. The system of claim 6, wherein the processor is further configured to determine a most reliable stream to be the decoded stream.

8. The system of claim 7, wherein the processor is configured to determine a reliability of a stream using a power level associated with each of the data streams or a modulation and coding scheme value associated with each of the data streams.

9. The system of claim 6, wherein the linear MIMO decoding comprises Minimum Mean Square Error (MMSE) decoding.

10. Logic stored in a non-transitory computer readable medium that when executed by a processor is configured to:
  receive a plurality of data streams from an equal numbered plurality of endpoints;
  decode the plurality of data streams in an equal numbered plurality of stages, wherein at least a first stage uses linear multiple-input and multiple-output (MIMO) decoding and at least a last stage uses maximum likelihood decoding; and
  generate a residual signal during each stage of decoding except for a final stage, the residual signal comprising a subset of data streams less than the plurality of data streams, wherein:
    for the first stage, generating the residual signal comprises removing the stream decoded during the first stage from the plurality of data streams; and
    for each subsequent stage except for the last stage, generating the residual signal comprises removing the stream decoded during the respective stage from the plurality of data streams of a previous residual signal generated during an immediately preceding stage.

11. The computer readable medium of claim 10, wherein the logic is further configured to determine a most reliable stream to be the decoded stream.

12. The computer readable medium of claim 11, wherein the logic is further configured to determine a reliability of a stream using a power level associated with each of the data streams or a modulation and coding scheme value associated with each of the data streams.

13. The computer readable medium of claim 10, wherein the linear MIMO decoding comprises Minimum Mean Square Error (MMSE) decoding.

* * * * *